United States Patent
Zampieri et al.

(10) Patent No.: US 11,746,854 B2
(45) Date of Patent: Sep. 5, 2023

(54) SEAMLESS GEARBOX

(71) Applicant: Ducati Motor Holding SPA, Bologna (IT)

(72) Inventors: Pierliuigi Zampieri, Sala Bolognese (IT); Dario Carghini, Castel San Pietro Terme (IT); Christian Antoniutti, Schwäbisch Gmünd (DE); Tim Gee, Leamington Spa (GB); Jonathan Philip Hodgson, Kenilworth (GB)

(73) Assignee: Ducati Motor Holding SPA

( * ) Notice: Subject to any disclaimer, the term of this patent is extended or adjusted under 35 U.S.C. 154(b) by 165 days.

(21) Appl. No.: 17/263,000

(22) PCT Filed: Jul. 12, 2019

(86) PCT No.: PCT/EP2019/068812
§ 371 (c)(1),
(2) Date: Jan. 25, 2021

(87) PCT Pub. No.: WO2020/020664
PCT Pub. Date: Jan. 30, 2020

(65) Prior Publication Data
US 2021/0164542 A1   Jun. 3, 2021

(30) Foreign Application Priority Data

Jul. 25, 2018  (IT) .................. 102018000007500

(51) Int. Cl.
*F16H 3/00* (2006.01)
*F16H 3/085* (2006.01)
*F16C 19/38* (2006.01)

(52) U.S. Cl.
CPC ............ *F16H 3/006* (2013.01); *F16C 19/38* (2013.01); *F16H 3/085* (2013.01); *F16C 2361/61* (2013.01); *F16H 2200/0052* (2013.01)

(58) Field of Classification Search
CPC ... F16H 3/006; F16H 3/085; F16H 2200/0052
(Continued)

(56) References Cited

U.S. PATENT DOCUMENTS 5,613,401 A * 3/1997 Maurizio ............... F16H 59/02
                                                    74/330
5,950,781 A * 9/1999 Adamis ............... B60W 10/113
                                                    74/330

(Continued)

FOREIGN PATENT DOCUMENTS

| CN | 102003503 | 4/2011 |
|---|---|---|
| DE | 10 2015 114054 | 12/2016 |
| DE | 10 2016 207103 | 11/2017 |

OTHER PUBLICATIONS

International Search Report and Written Opinion for PCT/EP2019/068812, dated Nov. 8, 2019, 14 pages.

*Primary Examiner* — Ha Dinh Ho
(74) *Attorney, Agent, or Firm* — CASIMIR JONES, SC; Brian F. Bradley

(57) ABSTRACT

The present invention relates to a seamless gearbox, particularly for motorcycles, which is mechanically operated e.g. by the rider's foot. The input shaft of the seamless gearbox of the present invention is split into two elements, each of them is connected to the "next" or "previous" gear, that are linked via the system to the torque input (e.g. clutch). The system according to a preferred embodiment of the present invention allows, via mechanical functionality only, to select only the appropriate of the two elements to transmit torque, based on relative speed between the two elements, and avoiding (for safety reasons) to have simultaneous torque transmission to both elements at the same time.

9 Claims, 16 Drawing Sheets

(58) Field of Classification Search
USPC .......................................................... 74/330
See application file for complete search history.

(56) References Cited

U.S. PATENT DOCUMENTS

| | | | |
|---|---|---|---|
| 6,364,809 B1* | 4/2002 | Cherry ................ | F16H 61/0437 |
| | | | 477/86 |
| 9,874,252 B2* | 1/2018 | Kimes ..................... | F16D 23/02 |
| 9,958,032 B2* | 5/2018 | Eo ........................... | F16H 3/006 |
| 10,047,830 B2* | 8/2018 | Eo ........................... | F16H 3/097 |
| 10,337,588 B2* | 7/2019 | Eo .......................... | F16H 37/043 |
| 10,677,296 B2* | 6/2020 | Kimes ................... | B60K 6/547 |

* cited by examiner

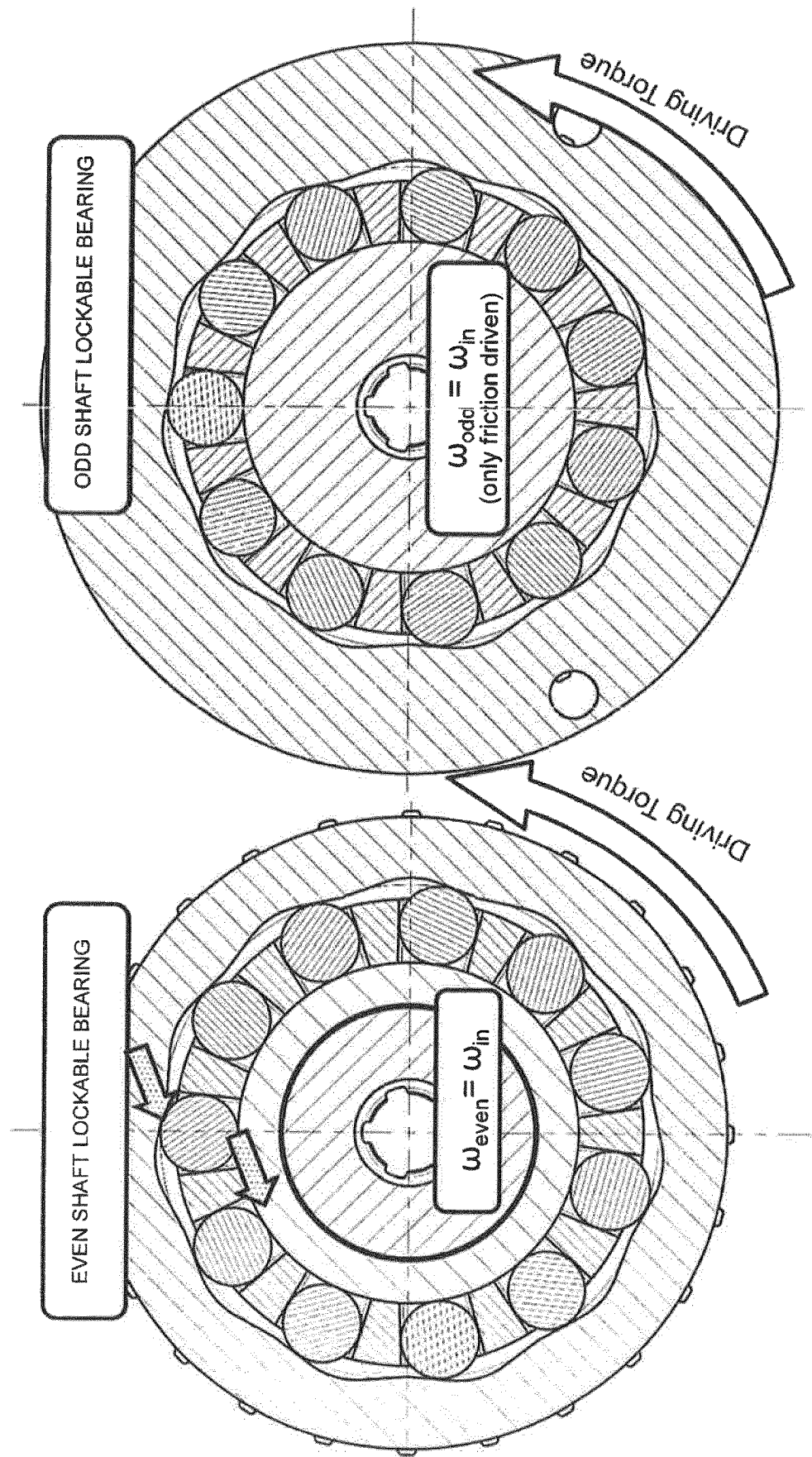

US 11,746,854 B2

SEAMLESS GEARBOX

TECHNICAL FIELD

The present invention relates to a seamless gearbox system, in particular for motorcycles.

BACKGROUND

Traditional motorcycle gearboxes operates the gear change in a way that the gearbox is in "neutral" position between one gear and the other, causing a torque interruption (zero traction force) for the time the gearbox is in this neutral position; this results in a lack of acceleration and a discontinuity on the force acting on the vehicle (destabilization).

To avoid this problem, several attempts to create a seamless gearbox change have been done in motor vehicles. In the specific field of motorcycles, the dimension limitations of the engine (which needs to stay within a relatively small space compared to that of a car) made the solution more difficult to be realised. The seamless gearbox operates such that there is no need to be in neutral state between gears, therefore no torque interruption happens during the gear shift (both in upshift and in downshift gear changes); vehicle stability is improved, and in motor racing this brings positive effects on laptime.

Recent known solutions are based on the dual clutch transmission (DCT) mechanism which provides two different clutches and two separate shafts, one for the odd speeds (e.g. 1, 3, 5) and one for the even ones (e.g. 2, 4, 6). It could be described as two separate transmission mechanism (one for odd speeds and one for even speeds) with their respective clutches and shafts contained within one housing, and working as one unit. They are controlled by electronic Central Units. The perfect management of the two clutches by the electronic central units is extremely important to avoid "conflicts" between the two shafts mechanisms. Furthermore, the actuation mechanism of DCT transmissions is normally an electro-hydraulic system including pressure pumps, control valves and oil reservoirs. This brings to a very complex equipment, which sensibly increases the overall weight, cost and manufacturing and service complexity of the motorcycle. All the mentioned drawbacks are not acceptable for a high performance motorcycle, making the use of a DCT transmission not convenient.

Other recent known solutions for seamless gearbox systems work without the use of any electronic control, being based on a very complex and precise combination of mechanical systems. This complexity and precision requires very high production costs and frequent maintenance done by highly skilled operators. For these reasons these solutions are not currently used in mass production motorcycles, and their use is limited to motor-racing applications.

It is an object of the present invention to alleviate at least some of the drawbacks of currently available prior art system.

SUMMARY OF THE INVENTION

According to the present invention, it is provided a motorcycle seamless gearbox system for selecting gears, including: a first input shaft for odd gears being associated to a first plurality of sprockets; a second input shaft for even gears, parallel to the first input shaft, the second shaft being associated to a second plurality of sprockets; an output shaft having a plurality of output sprocket, each of the plurality of output sprocket corresponding to one of the sprockets on the first input shaft or on the second input shaft; a torque management system adapted to transmit the torque alternatively and exclusively to one of the first and the second input shafts. The torque management system includes a first and a second lockable roller bearing and an input hub. The torque management system receives the torque from a main clutch through the input hub, and transmits the torque exclusively and selectively to only one of the two input shafts. The first input shaft for odd gears receives the torque from the first lockable roller bearing, when locked; and the second input shaft for even gears receives the torque from second lockable roller bearing, when locked, the first and second roller bearings being selectively and exclusively locked according to the relative rotation speed of the two input shafts. In a preferred embodiment of the present invention the first and second input shafts are placed coaxially wherein the first input shaft is preferably placed internally to the second input shaft.

In a possible embodiment of the present invention, the first input shaft can engage a 1st gear sprocket, a 3rd gear sprocket and a 5th gear sprocket, while the second input shaft can engage a 2nd gear sprocket, a 4th gear sprocket and a 6th gear sprocket, each sprocket in the first and second input shafts being associated to a corresponding sprocket in an output shaft.

In the motorcycle gearbox system described above the selection of gears is mechanically controlled e.g. by a selection barrel and a plurality of shift forks. More particularly the selection of gears is preferably mechanically controlled by a system of levers and dog rings.

In an alternative embodiment of the present invention, the lockable bearings of the torque management system can be a different kind of bearing, e.g. ball bearings: the essential features of the bearing is that they can roll (i.e. are "rolling") and can be locked (i.e. they are lockable).

According to a further aspect of the present invention it is provided a motorcycle including a seamless gearbox system as described above.

Through the present invention it is possible to realise a seamless gearbox mechanism integrated into a traditional gearbox, suitable both for mass production and racing motorcycles. The system according to a preferred embodiment of the present invention is completely mechanical (without requiring any electronic control) and is based on a pre-selection system: "next" gear is engaged while the "previous" gear is still engaged and torque is still transmitted by "previous" gear. As "next" gear overruns, the torque management system shifts torque connection from "previous" to "next" gear and then "previous" gear is disengaged. The system according to a preferred embodiment of the present invention works on all gear shifts, both in up and down shift.

The layout of the system according to a preferred embodiment of the present invention mostly corresponds to that of a traditional motorcycle gearbox, including input clutch, output shaft and output chain sprocket, selection barrel and forks for gear shift. The peculiarity is that the input shaft is split into two elements, each of them is connected to the "next" or "previous" gear, that are linked via the system to the input (clutch). The system according to a preferred embodiment of the present invention allows, via mechanical functionality only, to select only the appropriate of the two elements to transmit torque, based on relative speed between the two elements, and avoiding to have simultaneous torque transmission to both elements at the same time.

One of the advantages of the solution provided by the present invention is that the gear change mechanism remains conceptually unchanged from the traditional motorcycle, therefore the gear shift is actuated by a mechanical mechanism actuated by rider foot and the sequential gear change is obtained with a dog to dog engagement.

While the present description is addressed to motorcycles, those skilled in the art will easily appreciate that the same invention could be applied to the transmission of any other kind of motor vehicle.

BRIEF DESCRIPTION OF THE FIGURES

These and other advantages, goals and characteristics of the present invention will be better understood by those skilled in the art by the following description and with the help of the attached drawings which illustrate examples of embodiments which should not be interpreted as a limitation of the scope of the present invention disclosure which will defined by the attached set of claims.

In brief, the drawings show.

DETAILED DESCRIPTION OF PREFERRED EMBODIMENTS

Figure 1:
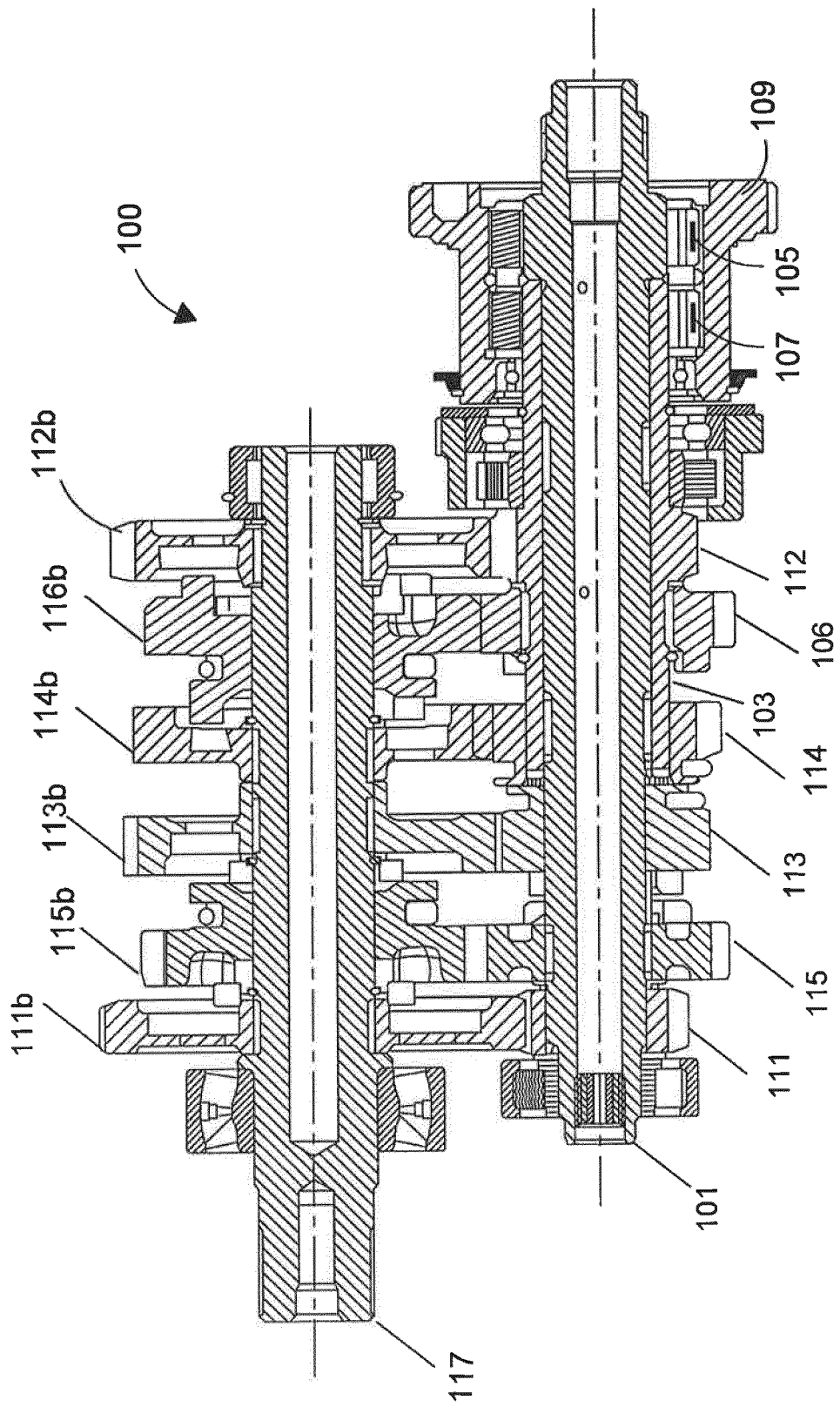
FIG. 1 represents the gearbox assembly according to a preferred embodiment of the present invention, showing the two input shafts and the output shaft

FIG. 1 shows a preferred embodiment of the present invention. The torque is transmitted from the engine through the primary gear (not displayed), the main clutch (not displayed), to the displayed gearbox system 100. The gearbox system includes two input shafts, one for the odd gears 101 and the other one for the even gears 103. In the present embodiment the odd shaft 101 is placed co-axially and internally to the even shaft, but different arrangements are possible (e.g with even shaft placed internally or with the two shafts placed not co-axially). Each input shaft is associated to a dedicated lockable roller bearing: in the present embodiment the odd shaft 101 is associated to the lockable roller bearing 105, while the even shaft 103 is associated to the lockable roller bearing 107. The torque management system receives the torque from a main clutch through the input hub 109, and transmits the torque exclusively and selectively to only one of the two input shaft 101 and 103. The first input shaft 101 for odd gears receives the torque from the first lockable roller bearing 105, when locked; and the second input shaft 103 for even gears receives the torque from second lockable roller bearing 107, when locked, the first and second roller bearings being selectively and exclusively locked according to the relative rotation speed of the two input shafts. In a preferred embodiment of the present invention the first and second input shafts are placed coaxially wherein the first input shaft 101 is preferably placed internally to the second input shaft 103. While in the present explanation a traction torque flow is described (i.e. transmitted from the engine to the wheel), those skilled in the art will easily appreciate that in coasting the torque is transmitted in the opposite direction. In a preferred embodiment, the odd input shaft 101 can engage the $1^{st}$ gear sprocket 111, the $3^{rd}$ gear sprocket 113 and $5^{th}$ gear sprocket 115, while the even input shaft 103 can engage the $2^{nd}$ 112, the $4^{th}$ 114 and the $6^{th}$ 116 gear sprockets. Each sprocket in the input shafts is associated to a corresponding sprocket in the output shaft 117: 111b for the $1^{st}$, 113b for the $3^{rd}$, 115b for the $5^{th}$, 112b for the $2^{nd}$, 114b for the $4^{th}$, 116b for the $6^{th}$ gears. In the present invention we refer to the case of a gearbox with 6 speeds, but other arrangements are possible: those skilled in the art will appreciate that suitable modifications of the gearbox system would be necessary. In the present embodiment, the lockable bearing of the torque management system are described as roller bearing, however any kind of rolling bearing could be used instead, e.g. ball bearing, provided they are lockable.

The gear selection is mechanically controlled by the selection barrel (not displayed in FIG. 1) and the shift forks (not displayed) like in a traditional motorcycle gearbox. In a traditional gearbox, not more than one pair of sprockets (e.g. 111 and 111b) can be engaged on the relative shaft at any given time, while in the described system according to the present invention, two pair of sprockets (e.g. 111 and 111b plus 112 and 112b) can be engaged at the same time. In particular, one gear associated to the odd input shaft and one associated to the even input shaft will be engaged at the same time during the gear shift operations: in a preferred embodiment the two pairs of sprockets engaged at the same time correspond to two consecutive gears (e.g. $1^{st}$ and $2^{nd}$, $2^{nd}$ and $3^{rd}$ and so on). The same double engagement happens both in upshift and in downshift operations.

Figure 2:
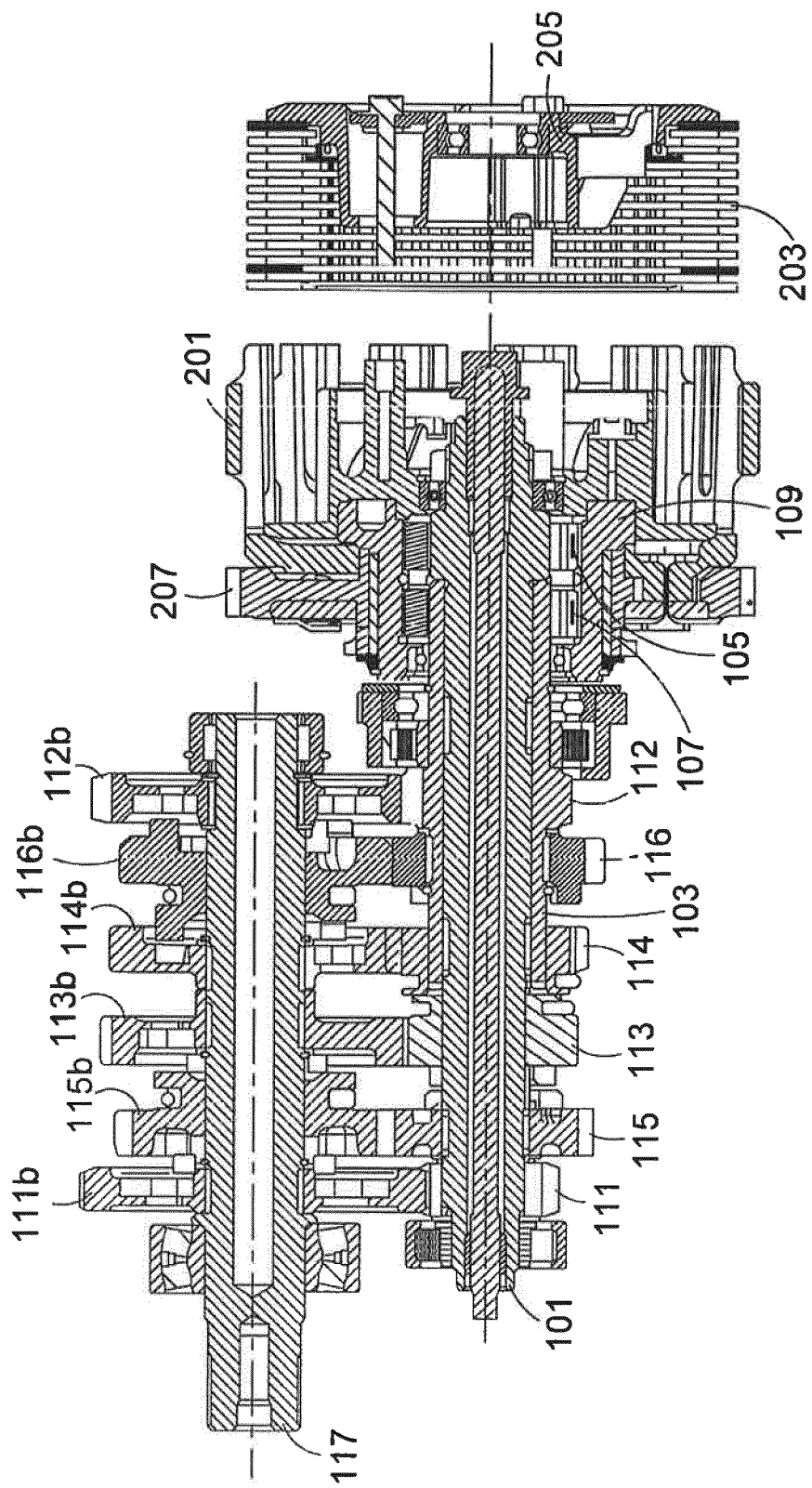
FIG. 2 represents the gearbox assembly according to a preferred embodiment of the present invention as shown in FIG. 1 with the addition of the main clutch assembly transmitting the torque to the input shafts through the torque management system.

FIG. 2 shows the gearbox system 100, with the addition of the main clutch (substantially corresponding to a traditional motorcycle clutch and including the external basket 201, the discs 203, the internal drum 205) connected to the primary gear sprocket 207 (engaged to the engine crankshaft, not displayed), and to the input hub 109.

Figure 3:
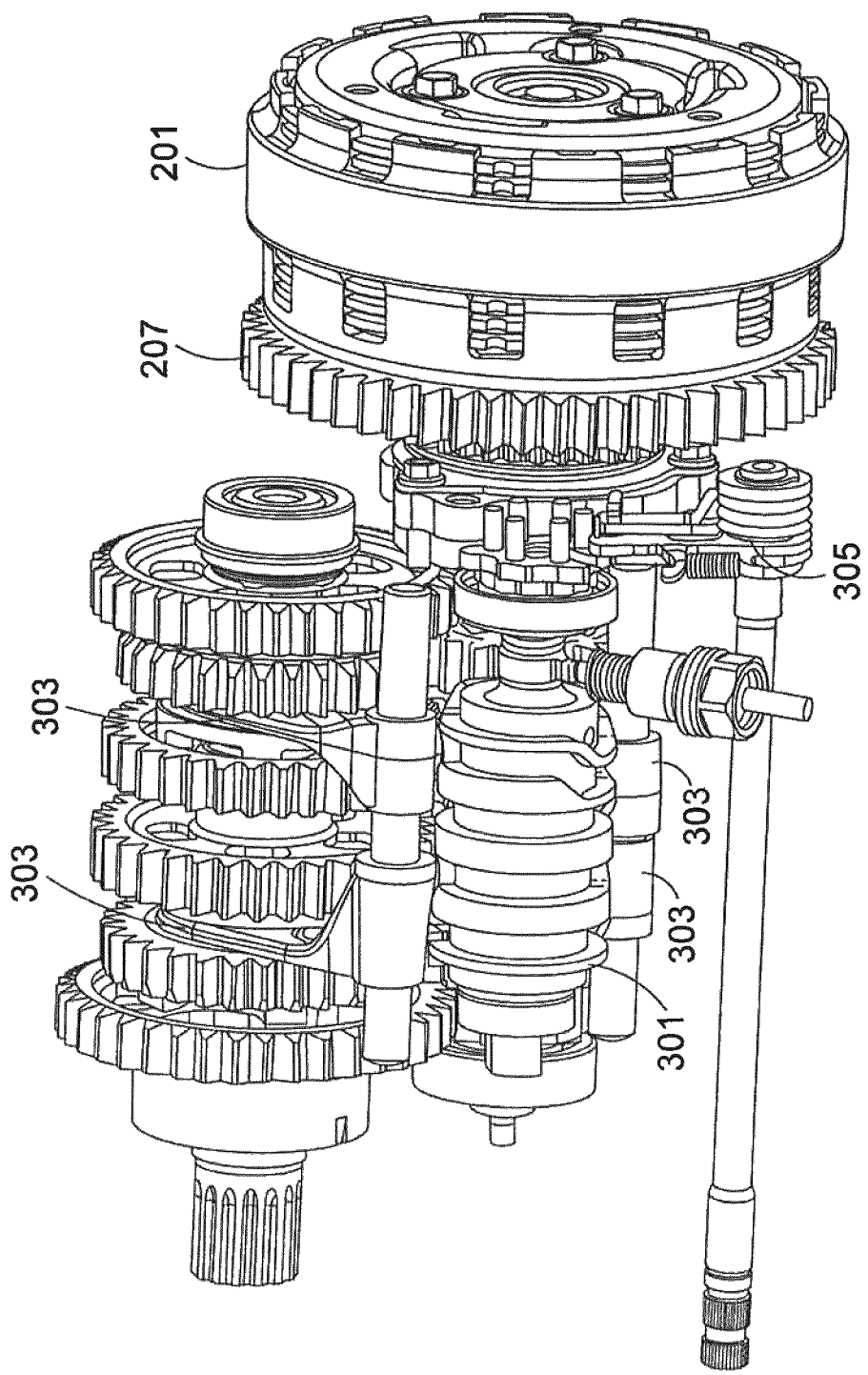
FIG. 3 is a three dimensional representation of the gearbox assembly as shown in FIG. 2 with the addition of the shift drum and the ratchet mechanism

FIG. 3 shows a prospective view gearbox system according to a preferred embodiment of the present invention, displaying the selection barrel 301, the shifting forks 303 and the ratchet mechanism 305. In a traditional 6-speed motorcycle gearbox there are normally 3 shifting forks operating the different gear sprockets, while in a preferred embodiment of the present invention an additional shifting fork is required, because the $3^{rd}$ and $4^{th}$ gear sprockets are associated to two different input shafts.

Figure 4:
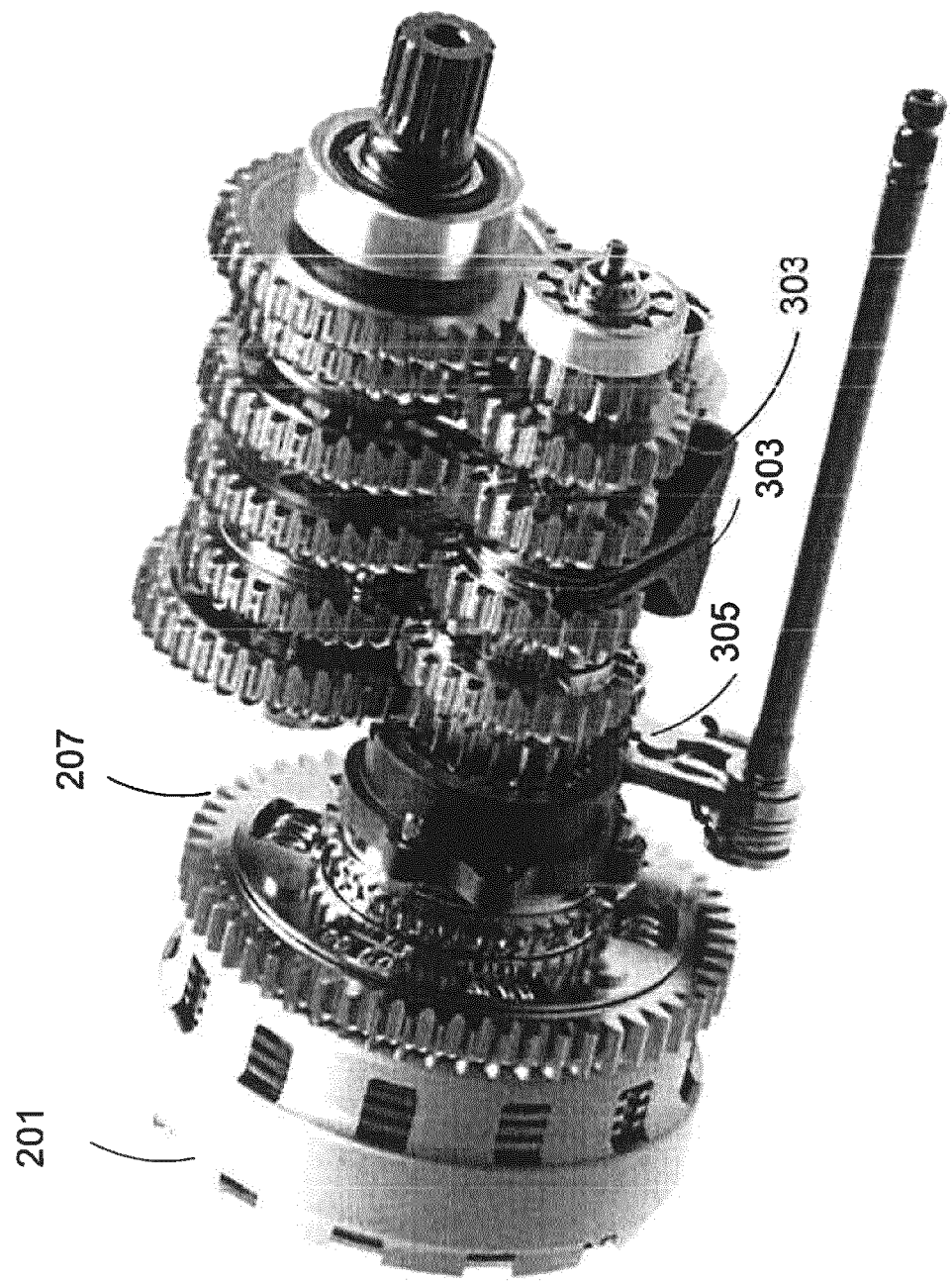
FIG. 4 is a rendering of the gearbox assembly as shown in FIG. 3.
Figure 5:
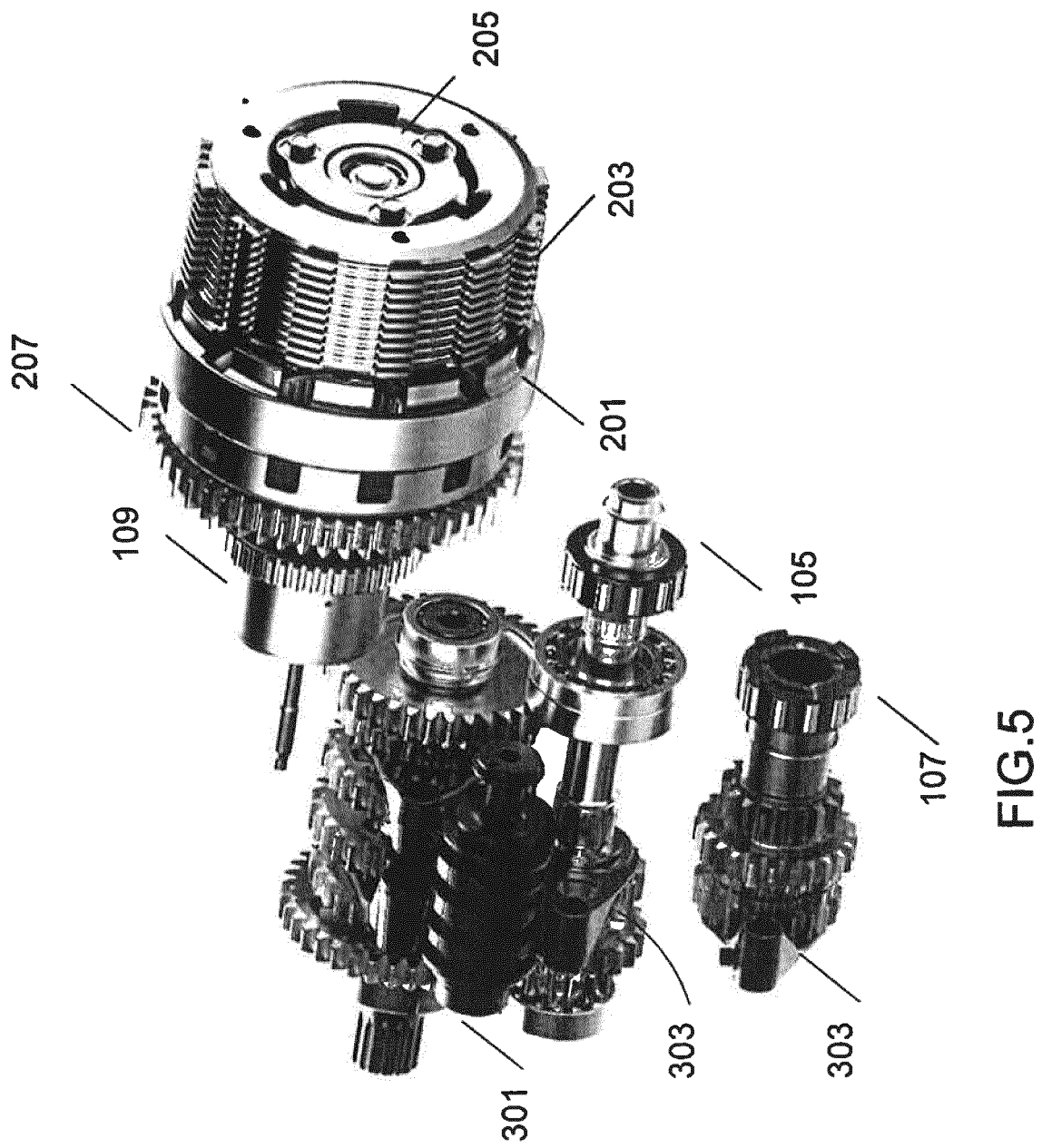
FIGS. 5 and 6 show some of the components of the gearbox assembly as shown in FIG. 4, separated one from the others.
Figure 6:
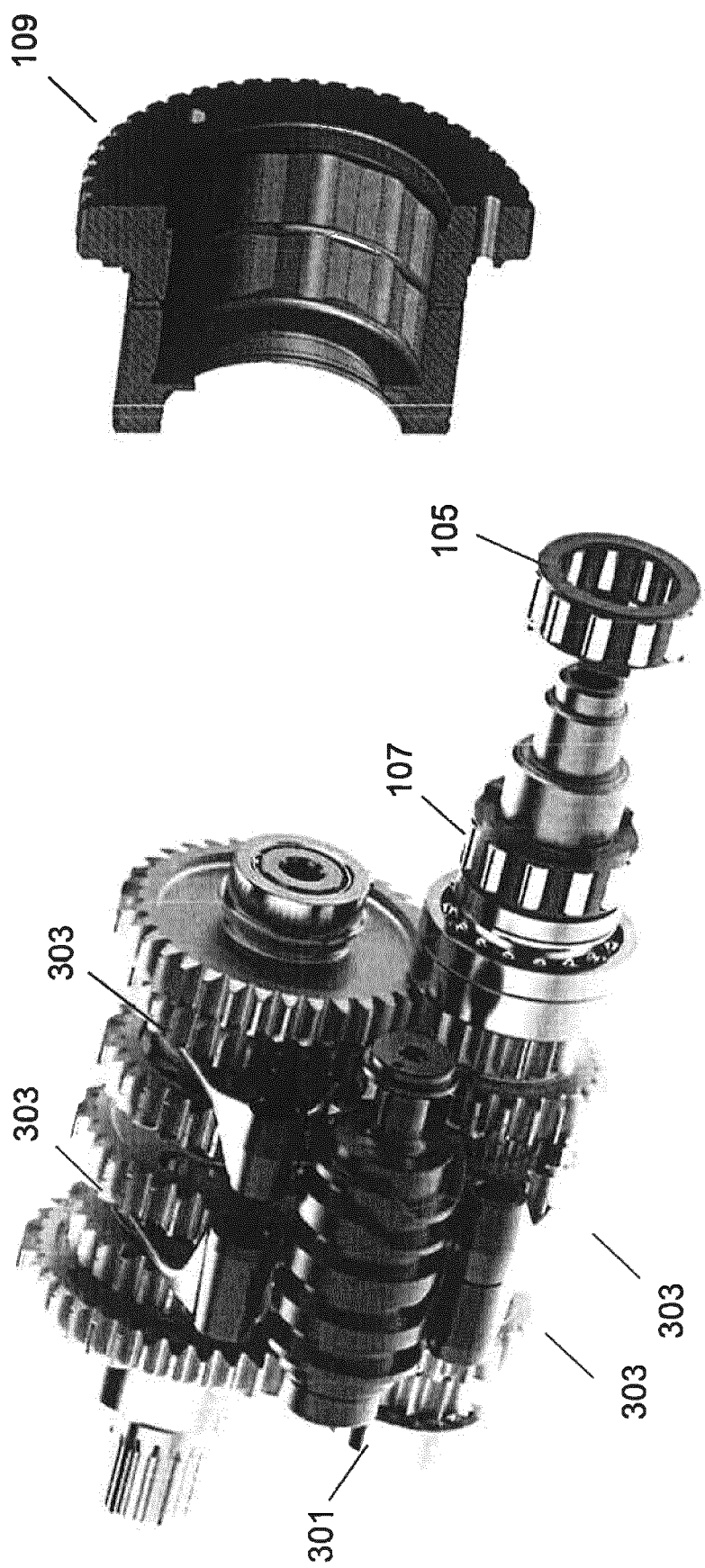

FIG. 4 shows a rendering of the gearbox assembly described above (same reference numbers are used to indicate the components). FIGS. 5 and 6 show a rendering with some of the components of the gearbox assembly as shown in FIG. 4, separated one from the others.

Figure 7:
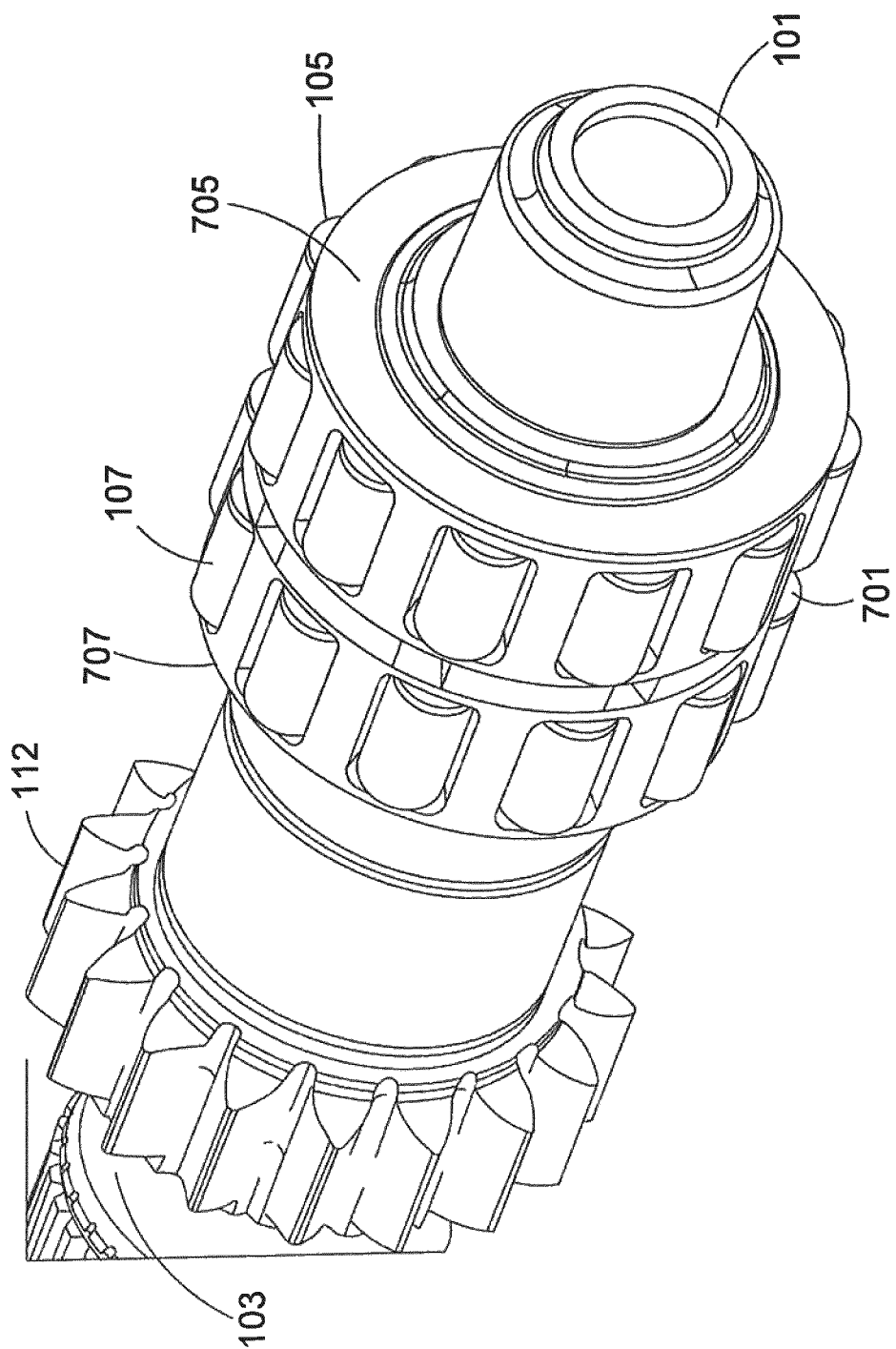
FIG. 7 is a schematic representation of the two lockable roller bearings transmitting torque exclusively and selectively to one of the input shaft, according to a preferred embodiment of the present invention.

FIG. 7 shows the double lockable roller bearing system of the preferred embodiment, where the lockable roller bearing 107 is coupled to the even input shaft 103 and the lockable roller bearing 105 is coupled to the odd input shaft 101. Each lockable roller bearing 107 and 105 is composed by several rollers 701 kept in place by a roller cage, respectively 707 and 705. The two roller cages 707 and 705 are engaged together with a dog-to-dog system allowing a defined angular clearance. In the preferred embodiment of the present invention the angular clearance is comprised between 10° and 25°.

Figure 8:
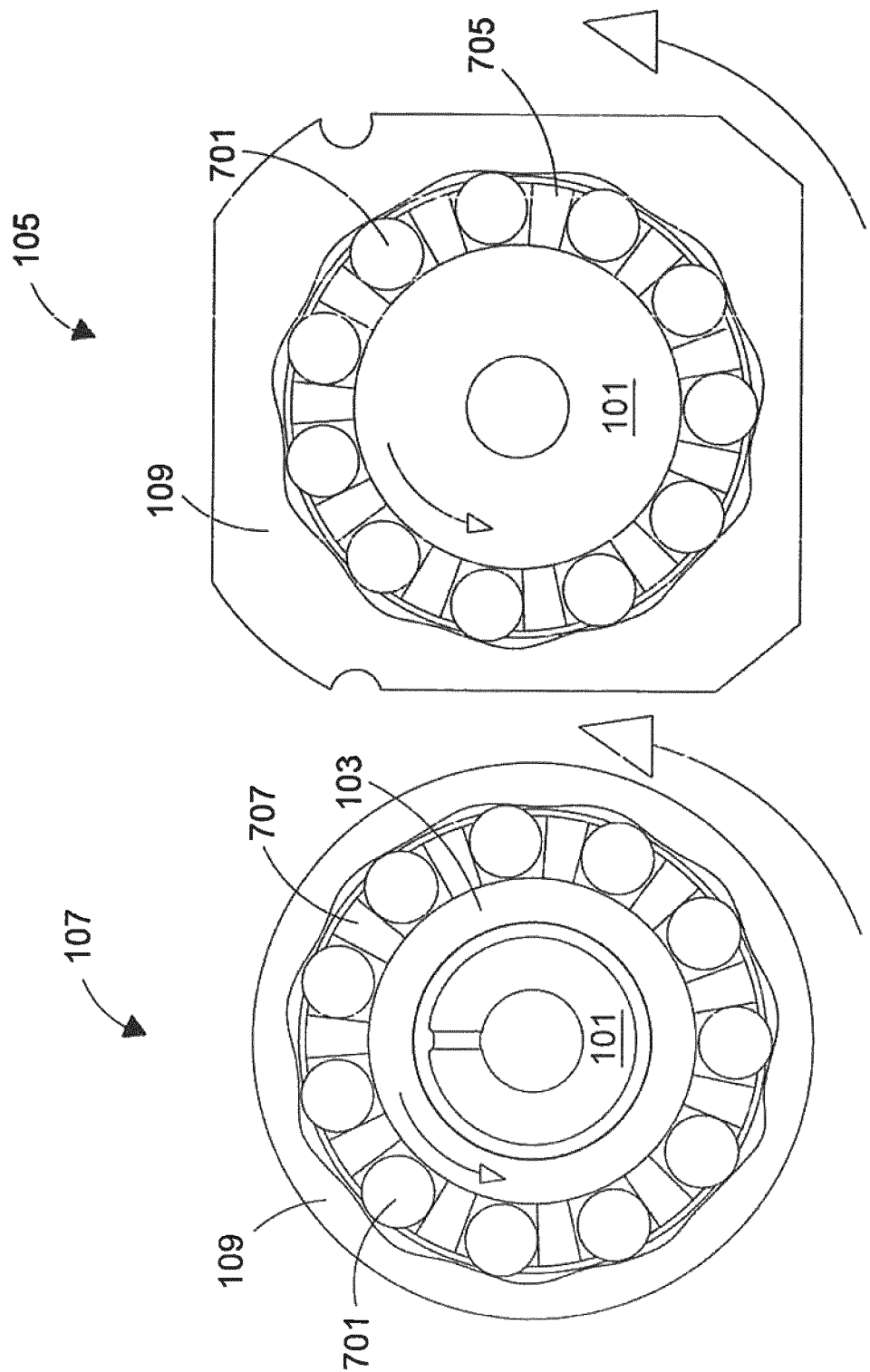
FIG. 8 is a schematic representation of a section of the two lockable roller bearings, showing the components of the lockable roller bearings and how they work during driving and coasting phases.

FIG. 8 shows a section of the two lockable roller bearings with the direction of the torque when transmitted from the engine to the wheel through the input hub 109, the rollers 701 and the even shaft 103 or the odd shaft 101.

In the following an example of how the gearbox assembly according to a preferred embodiment of the present invention works is illustrated. In particular we show the gearbox system starting from the $5^{th}$ gear engaged in Driving mode, then upshifted to the $6^{th}$ gear. The downshift operations work in the opposite direction.

Figure 9A:
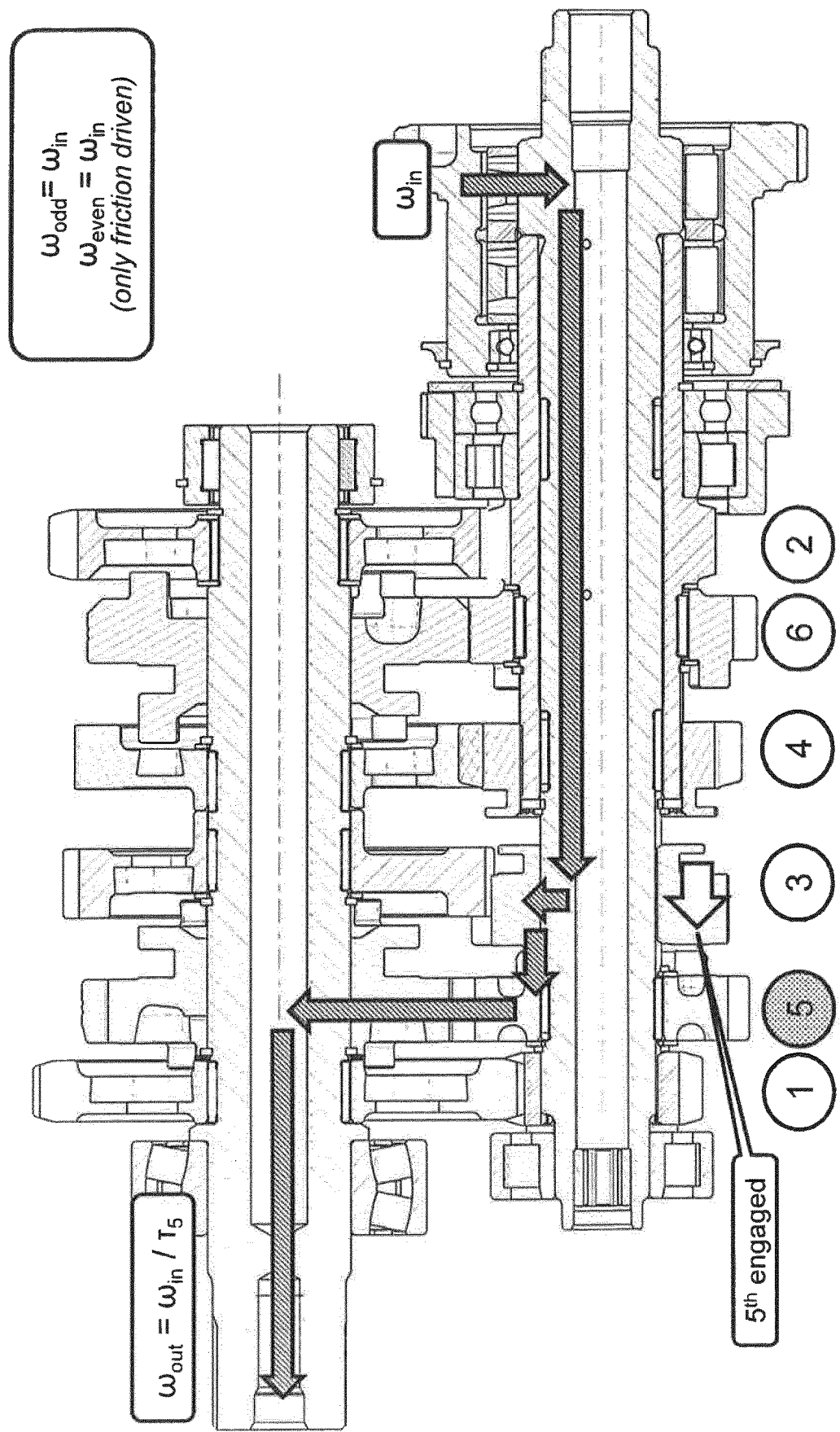
FIGS. 9a-12b show how the gearbox according to a preferred embodiment of the present invention works, during change of gears in driving phase and in coasting phase; in particular the upshift form 5th gear to 6th and the downshift from 6th to 5th gears are schematically represented.
Figure 9B:
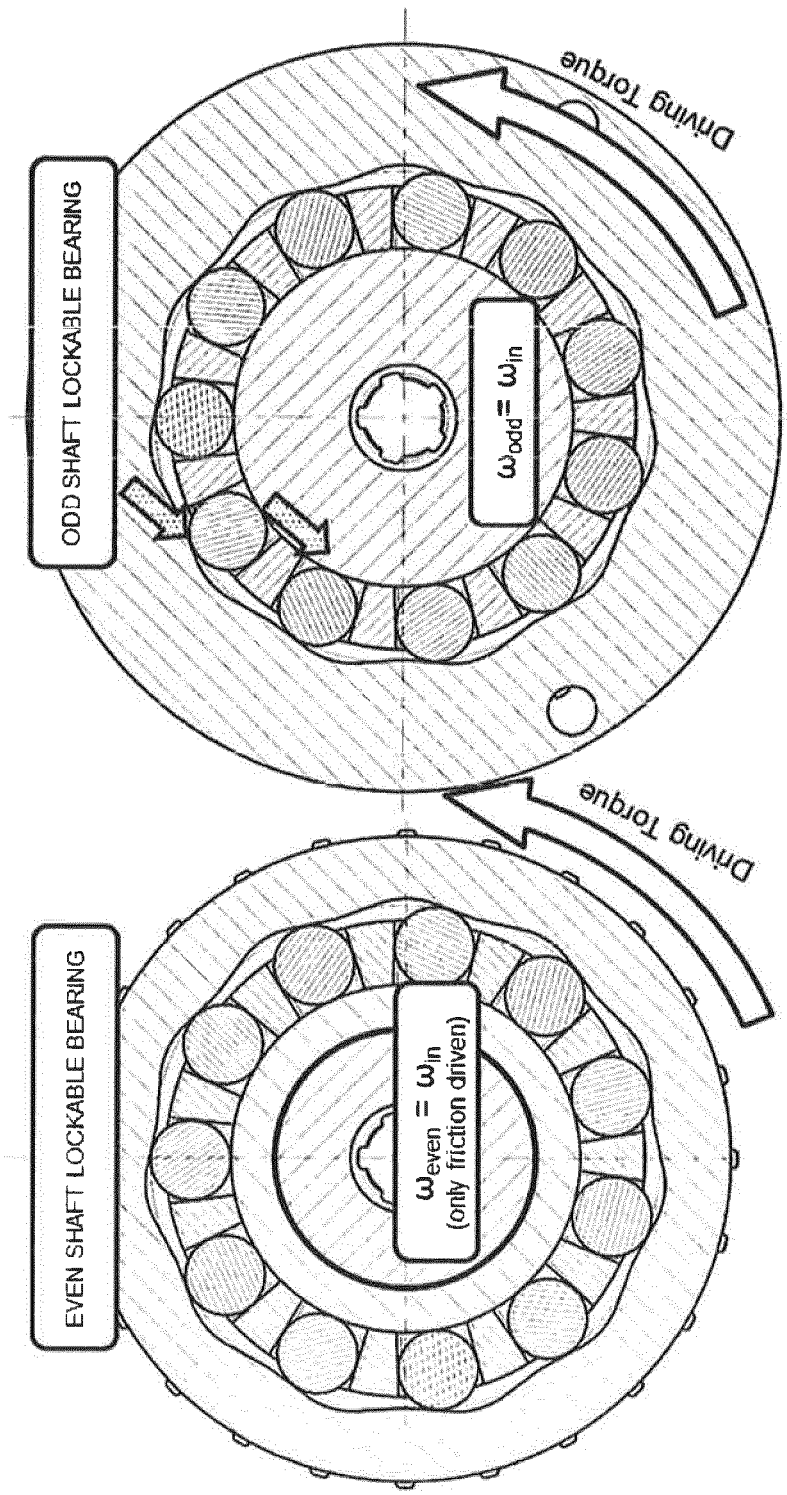

In FIGS. 9a-9b the $5^{th}$ gear is engaged and the engine is driving the wheel through the input shaft which receives torque from the lockable roller bearing (in this case the odd lockable roller bearing) and transmits torque to the output shaft 117, with the pair of sprockets (input sprocket and output sprocket) engaged one each other as shown in FIG. 9a. FIG. 9b shows the behaviour of the two lockable roller bearings with the rollers of the odd lockable roller bearing which are in contact and transmitting the torque, while the even shaft is idling.

Figure 10A:
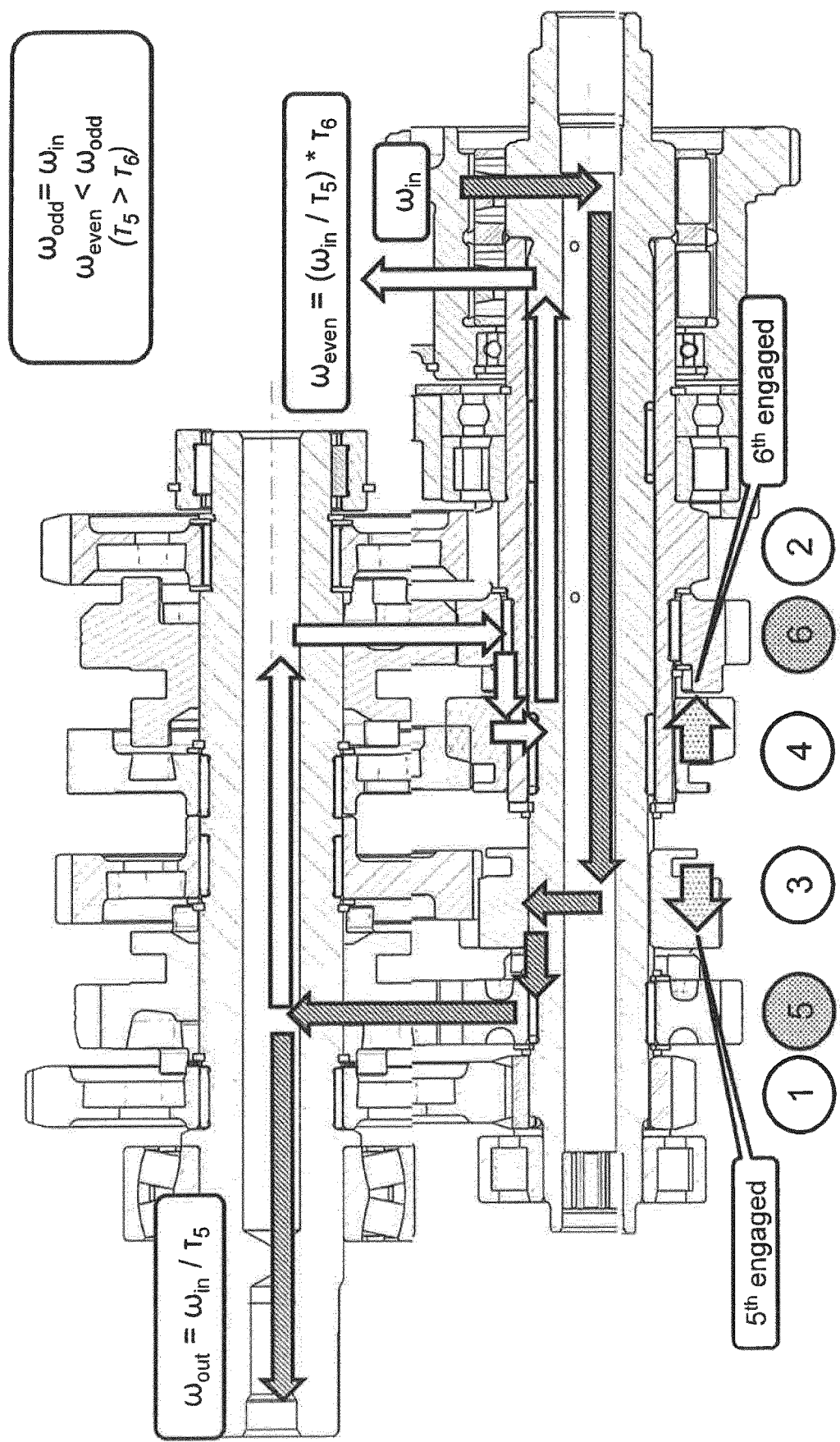
Figure 10B:
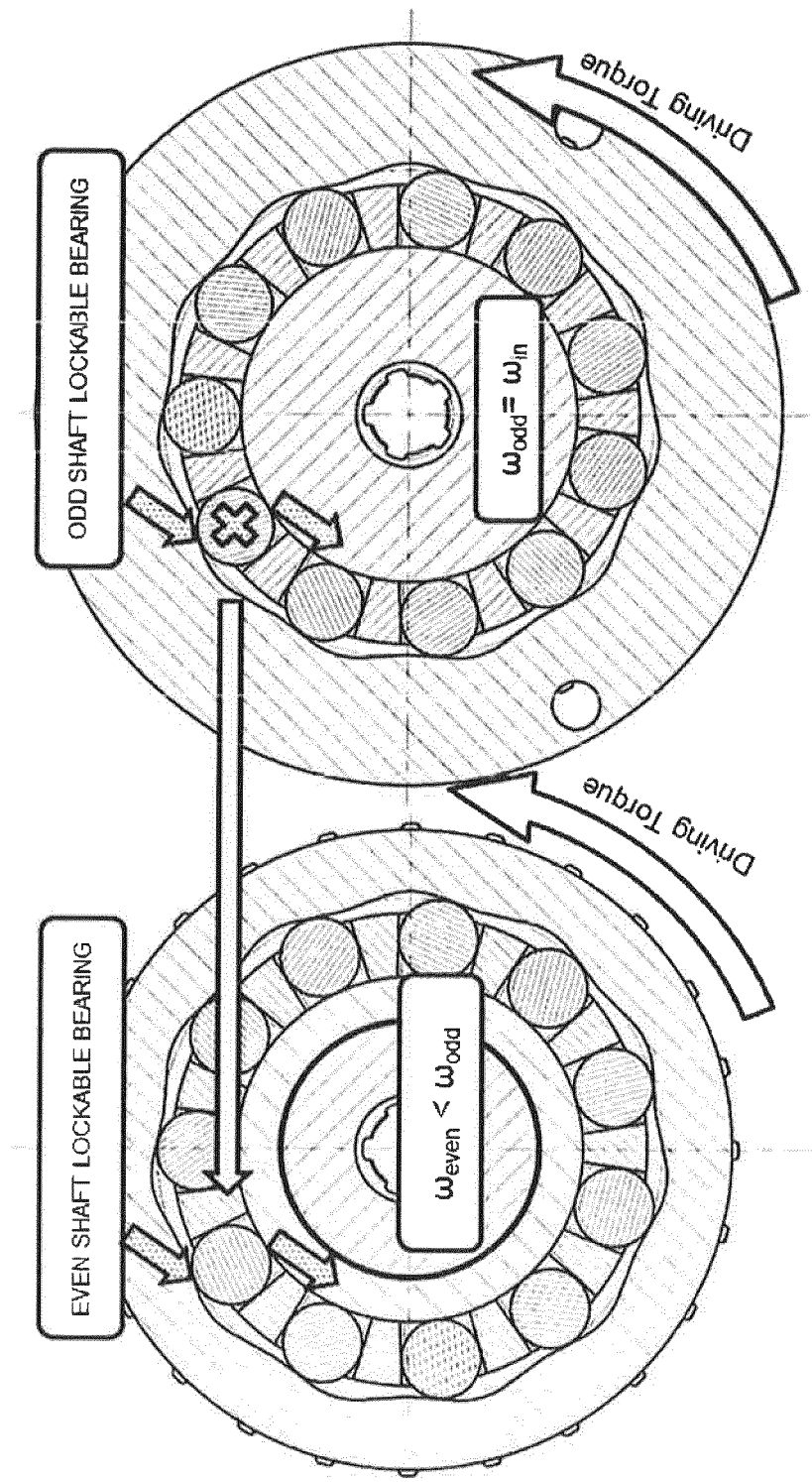
Figure 11A:
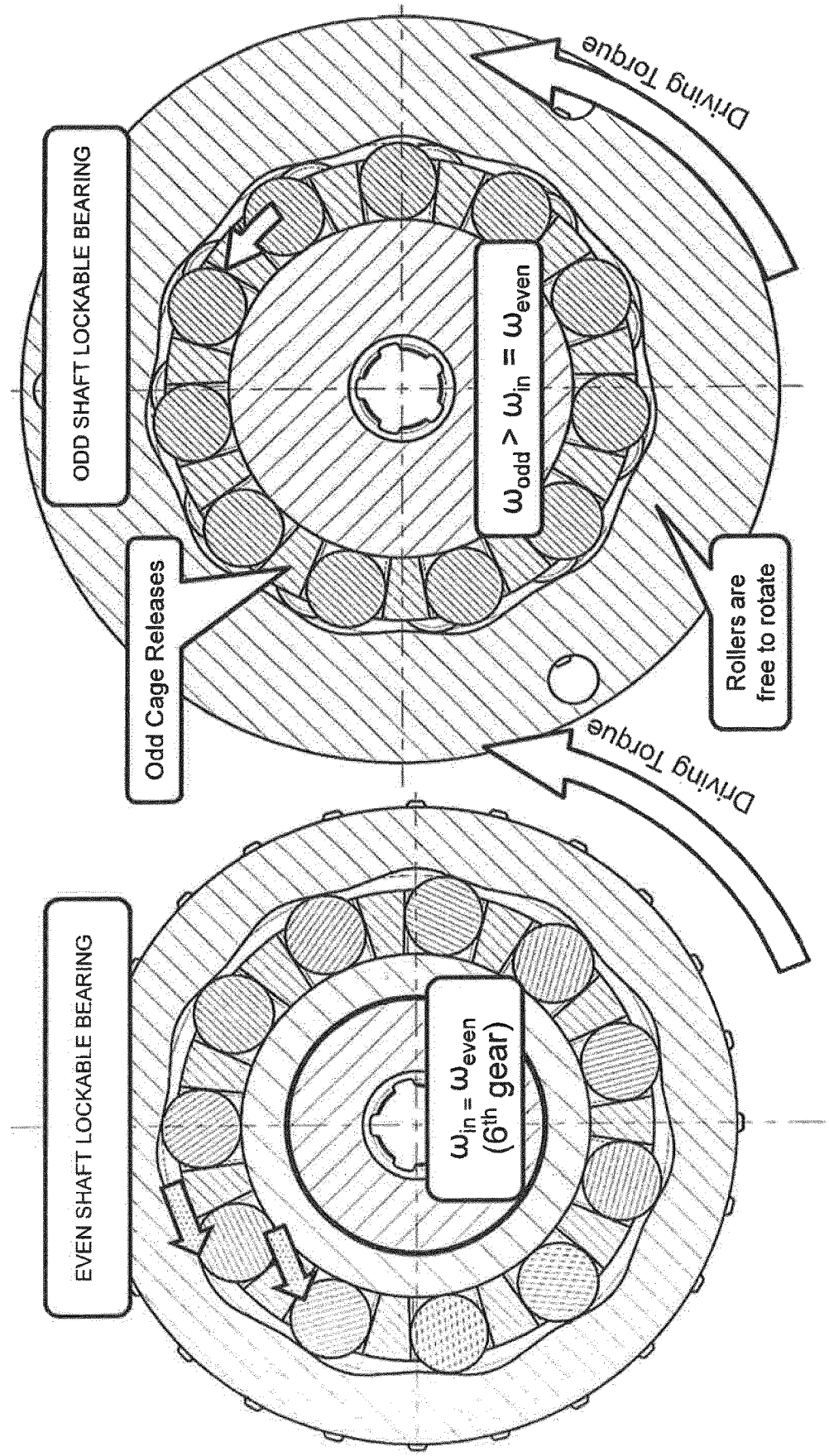
Figure 11B:
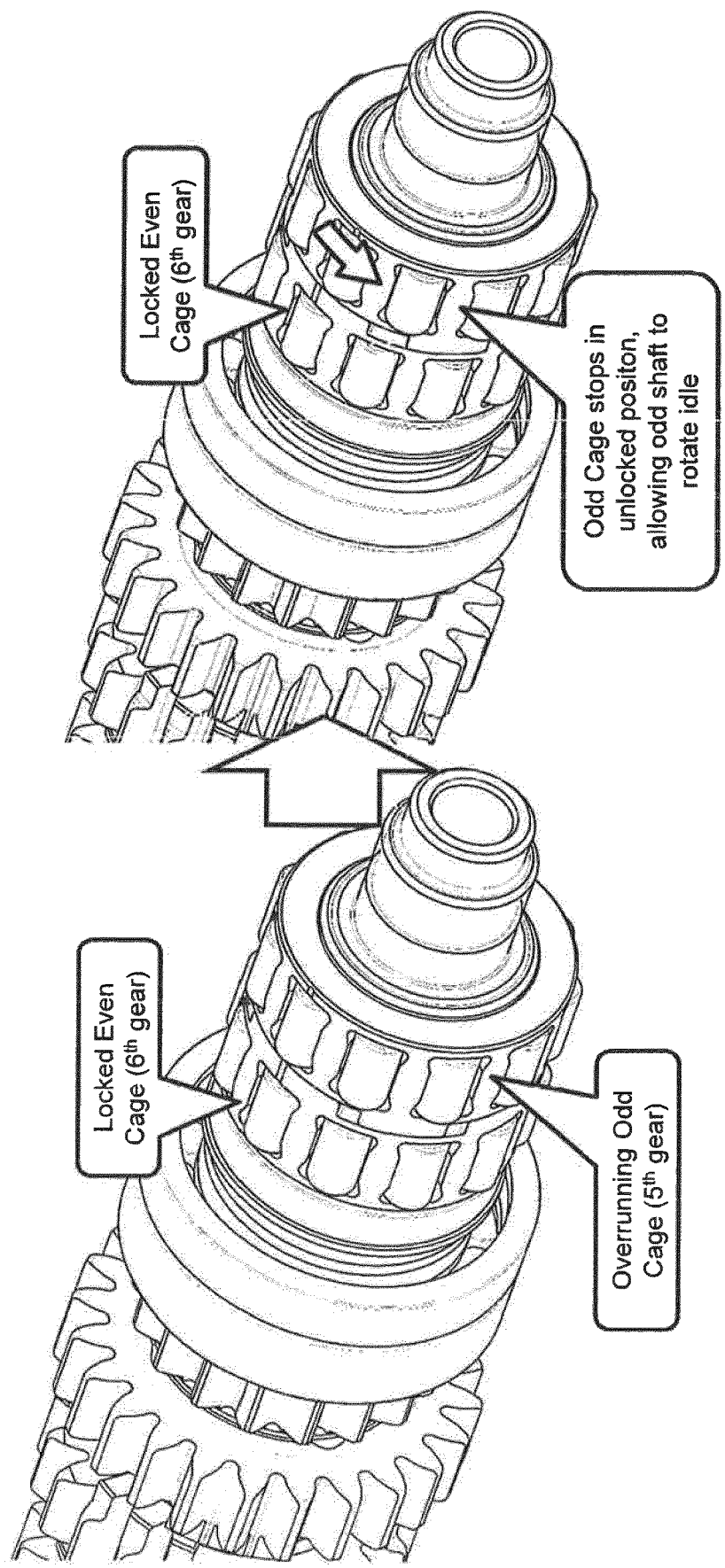

In FIGS. 10a-10b the gear is shifted from $5^{th}$ to $6^{th}$. In the drawings, ω represents the angular speed, while T is the transmission ratio: $\omega_{in}$, $\omega_{out}$, $\omega_{odd}$, $\omega_{even}$ represent respectively the rotational speed of input hub, output shaft, first and second input shaft FIG. 10a shows how the torque transmission is transferred from the pair of sprockets corresponding to the $5^{th}$ gear to the pair of sprockets corresponding to the $6^{th}$ gear. FIG. 10b shows the behaviour of the two lockable roller bearings: the even shaft is slower, therefore the torque is transferred to even rollers and the input is slowed down to even shaft speed ($6^{th}$ gear ratio). As shown in FIG. 11a, odd shaft overruns and drags cage and roller. Even cage is locked in position by rollers and prevents odd cage to rotate back to ramp. FIG. 11b shows the cage alignment in upshift from $5^{th}$ to $6^{th}$ gears.

Figure 12A:
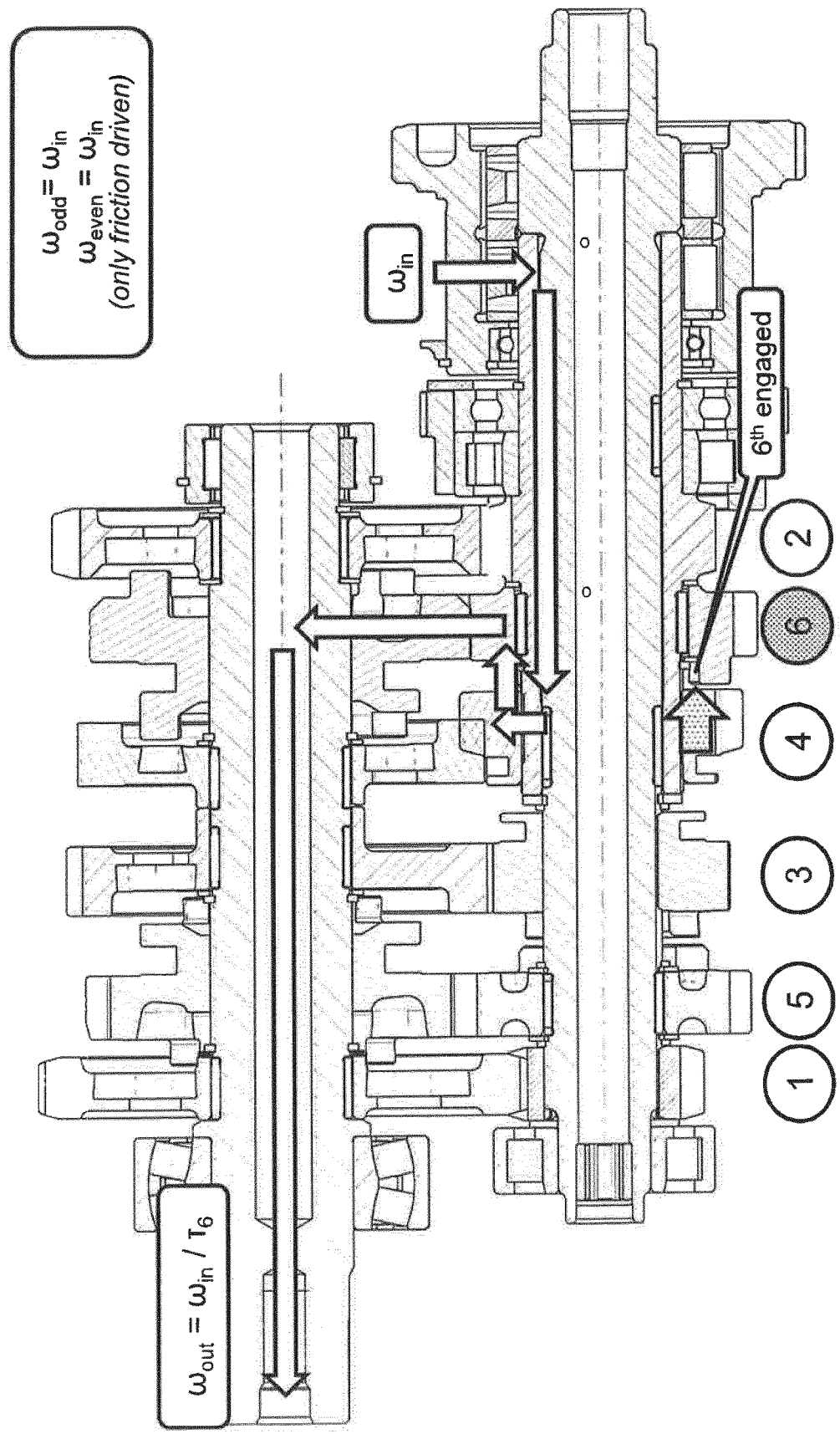

In a similar way to what has been illustrated for 5th gear engaged and driving (FIGS. 9a and 9b), FIG. 12a shows the transmission of torque from the input shaft (in this case it is the even input shaft) to the output shaft by the engagement of the pair of sprockets corresponding to the $6^{th}$ gear (one on the input shaft and one on the output shaft). FIG. 12b shows the behaviour of the lockable roller bearings, where the rollers are now in contact on even shaft and transmit torque, while the odd shaft is idling and will slow down to even shaft speed.

The invention claimed is:

1. A motorcycle seamless gearbox system for selecting gears, including:
   a first input shaft (101) for odd gears being associated to a first plurality of sprockets;
   a second input shaft (103) for even gears, coaxial to the first input shaft, the second shaft being associated to a second plurality of sprockets;
   an output shaft (117) having a plurality of output sprockets, each of the plurality of output sprocket corresponding to one of the sprockets on the first input shaft or on the second input shaft;
   a torque management system adapted to transmit the torque alternatively and exclusively to one of the first and the second input shafts, wherein the torque management system includes a first (105) and a second (107) lockable roller bearing and an input hub (109), wherein the first input shaft (101) for odd gears receives the torque from the first lockable roller bearing (105), when locked, and the second input shaft (103) for even gears receives the torque from the second lockable roller bearing (107), when locked, the first and second roller bearings being selectively and exclusively locked according to the relative rotation speed of the two input shafts.

2. The motorcycle gearbox system of claim 1 wherein the torque management system receives torque from a main clutch through the input hub (109).

3. The motorcycle gearbox system of claim 1 wherein the first input shaft (101) is placed internally to the second input shaft (103).

4. The motorcycle gearbox system of claim 1, wherein the first input shaft (101) can engage odd gear sprockets, while the second input shaft (103) can engage even gear sprockets, each sprocket in the first and second input shafts being associated to a corresponding sprocket in the output shaft.

5. The motorcycle gearbox system of claim 4 wherein the first input shaft (101) can engage a 1st gear sprocket (111), a 3rd gear sprocket (113) and a 5th gear sprocket (115), while the second input shaft (103) can engage a 2nd gear sprocket (112), a 4th gear sprocket (114) and a 6th gear sprocket (116), each sprocket in the first and second input shafts being associated to a corresponding sprocket in the output shaft (117).

6. The motorcycle gearbox system of claim 1, wherein the selection of gears is mechanically controlled by a selection barrel and a plurality of shift forks.

7. The motorcycle gearbox system of claim 1, wherein the selection of gears is mechanically controlled by a system of levers and dog rings.

8. A motorcycle seamless gearbox system for selecting gears, including:
   a first input shaft (101) for odd gears being associated to a first plurality of sprockets;
   a second input shaft (103) for even gears, coaxial to the first input shaft, the second shaft being associated to a second plurality of sprockets;
   an output shaft (117) having a plurality of output sprocket, each of the plurality of output sprocket corresponding to one of the sprockets on the first input shaft or on the second input shaft;
   a torque management system adapted to transmit the torque alternatively and exclusively to one of the first and the second input shafts, wherein the torque management system includes a first (105) and a second (107) lockable bearing and an input hub (109), wherein the first input shaft (101) for odd gears receives the torque from first lockable bearing (105), when locked and the second input shaft (103) for even gears receives the torque from second lockable bearing (107), when locked, the first and second bearings being selectively and exclusively locked according to the relative rotation speed of the two input shafts.

9. A motorcycle including the motorcycle gearbox system of claim 8.

* * * * *